United States Patent [19]
Murray et al.

[11] Patent Number: 5,740,195
[45] Date of Patent: Apr. 14, 1998

[54] TEMPERATURE COMPENSATED RESISTIVE LASER ELECTRODE ASSEMBLY

[75] Inventors: Michael W. Murray, Palm City; Kevin M. Dickenson, Jupiter, both of Fla.

[73] Assignee: Lite Jet, Inc., Jupiter, Fla.

[21] Appl. No.: 519,851

[22] Filed: Aug. 25, 1995

[51] Int. Cl.⁶ .................................................. H01S 3/097
[52] U.S. Cl. .................................................. 372/87
[58] Field of Search .................................................. 372/87

[56] References Cited

U.S. PATENT DOCUMENTS 3,743,881  7/1973  Blaszuk .................................. 313/217
3,986,134  10/1976  Meneely .................................. 331/94.5
4,166,986  9/1979  Hundstad .................................. 331/94.5
4,905,251  2/1990  von Dadelszen .................................. 372/87

*Primary Examiner*—Rodney B. Bovernick
*Assistant Examiner*—Robert E. Wise
*Attorney, Agent, or Firm*—Pennie & Edmonds LLP

[57] ABSTRACT

A Transverse Excitation (TE) laser that produces a uniform discharge by utilizing a layered resistive electrode assembly, which includes a layer of positive temperature coefficient material that works in combination with a layer of negative coefficient material. The layered resistive electrode assembly distributes the discharge current uniformly throughout the electrode assembly and the associated gas discharge, and compensates for temperature induced resistivity variations of the electrode assembly.

49 Claims, 7 Drawing Sheets

PROFILED ELECTRODE CROSS SECTION

TEMPERATURE COMPENSATED RESISTIVE LASER ELECTRODE ASSEMBLY

TECHNICAL FIELD OF THE INVENTION

The present invention relates to transverse excitation (TE) or transverse excitation atmospheric (TEA) lasers, and more particularly, to a TE laser that distributes discharge current uniformly by compensating for temperature induced resistivity variations in the electrode assembly.

BACKGROUND OF THE INVENTION

A transverse excitation (TE) laser is a gas discharge laser with transverse excitation of the laser gas. The first transverse excitation (TE) lasers were first built in the early 1970's and consisted of arrays of resistively ballasted metal pins arranged in rows extending along the length of an optical resonator. TE lasers were direct current (DC) discharge devices that required excitation pulses to be restricted to very short periods of time, typically a few microseconds. The pulsed discharge durations were limited to a few microseconds because the large volume glow discharge conditions that existed at the beginning of an excitation pulse would constrict and develop into an arc discharge after only a few microseconds.

Unlike glow discharges, the arc discharges failed to pump the entire volume of the laser, and therefore, were inefficient and not desirable. To overcome these problems, the excitation pulse would be turned off just before an arc discharge would develop.

TE lasers with a higher pressure of operation were also pursued in an effort to increase the concentration of the laser gain media and resulting laser output. However, the glow discharges were more difficult to produce and maintain as the laser gas pressures were increased.

Therefore, the primary challenge concerning TE lasers has been the production of a large volume glow discharge for the longest possible pulse duration in the highest pressure laser mixture.

Uniformity of the parameters affecting the laser discharge has been recognized as being the primary objective for producing large volume glow discharges.

The parameters affecting the laser discharge include: the electric field distribution in the discharge space, the uniform pre-seeding of the laser gas mixture in the discharge volume with free electrons, the uniformity of electrode surface conditions, and the gas temperature distribution in the discharge volume.

Glow discharge formation and maintenance were found to be improved by the use of profiled electrodes rather than the arrays of pins used in the first TE lasers.

Profiled electrodes were helpful because plasma non-uniformity in the gas discharge tends to cause distortions to the applied electric field, which distortions could be manipulated with the configuration of the profiled electrodes.

Furthermore, any non-uniformity of the plasma at one location will tend to grow and concentrate at that location, leading to an even greater local distortion of the electric field. The interaction between the applied electric field and the plasma will quickly result in the volume glow discharge collapsing into an arc discharge at one location.

The object of the profiled electrode is to produce a large volume discharge with a uniform electric field. The electrode profile was designed to minimize any distortion of the electric field in the discharge volume due to the effects of the fringing fields that exist at the finite boundaries of the electrodes. The most commonly used electrode profile was known as the Rogowski profile.

Nevertheless, the use of profiled electrodes alone is not enough to prevent arc formation since glow discharges do not naturally form throughout the discharge volume between two profiled electrodes when a voltage pulse is applied. Typically, a breakdown will occur at one location in the discharge volume due to a free electron, which will quickly degenerate into an arc discharge.

To prevent the arc discharge from developing, volume pre-ionization is used. Pre-ionization is when an ultraviolet (UV) light source external to the glow discharge volume is used to ionize gas throughout the glow discharge volume before the electric field is applied. The pre-ionization in effect uniformly covers the entire volume between the profiled electrodes with free electrons so that no one particular electron has an opportunity to produce an arc discharge.

Profiled electrodes, in combination with the UV pre-ionization, are somewhat successful in preventing arc discharge; however, other parameters affecting the glow-to-arc transition process also need improvement.

One of the parameters that needs improvement is the uniformity of the surface conditions on the profiled electrodes, particularly the cathode electrode. Since TE lasers are DC discharge devices, the secondary emission properties of the cathode have an influence on the current distribution flowing through the glow discharge volume. If a particular spot on the cathode surface favors the enhanced conduction of discharge current, then the discharge will tend to concentrate at that spot, and in turn, the electric field will become distorted and a glow-to-arc transition will take place.

The enhanced conduction at one particular spot may be caused from any anomaly on the surface of the electrode. An anomaly on the electrode surface would emit more electrons at that particular location. The anomaly on the electrode surface may be caused by, for example, dust or oxidation.

The enhanced conduction at any particular spot with an anomaly on the electrode surface, modifies the electric field, leading to electric field distortion and then to a glow-to-arc transition.

Therefore, the surfaces of the profiled electrodes must be polished, cleaned, free from anomalies, and conditioned by operating the electrodes at reduced pulse energy levels until the electrodes operate without developing the arcs.

Another factor that affects the surface conditions of the TE laser electrodes is the ability of the electrode material to resist the formation of hot spots as a result of the arcs. Arcs have the capability to concentrate enough energy in one particular spot on an electrode surface to pit the surface. The resulting electric field is non-uniform in the region of the pit, which leads to additional arcing at the same location, which perpetuates the arcing problem. Therefore, the profiled TE laser electrodes not only have to be polished extensively, but must be made from a high temperature metal or material, such as nickel or stainless steel, that will resist arc surface damage.

Yet another factor that can lead to a glow-to-arc transition in a TE laser is non-uniform heating of the laser gas. As the temperature in a particular region in the laser gas is raised in relation to the surrounding regions, the relative ionization rate in that region will increase, and as a result, the discharge will become non-uniform.

As described above, once a discharge non-uniformity is established, the electric field becomes increasingly distorted and the glow-to-arc transition process rapidly occurs.

To overcome discharge non-uniformity due to increases in the temperature, a technique was developed of rapidly flowing the laser gas through the space between the profiled electrodes in a direction transverse to the optic axis of the laser. This technique allowed TE lasers to operate at pulse repetition rates of thousands of Hertz (HZ).

The methods of suppressing the glow-to-arc transition process described above were successful to the extent that the need for ballast resistors in the circuit of TE lasers no longer existed. As stated above, the early TE lasers used an array of resistively ballasted metal electrode pins. The ballast resistors attempted to uniformly distribute the current between the electrode pins; however, the resistive ballast requires input pulse energy, which negates some energy that could otherwise be used for the laser discharge.

Prior U.S. Patents have addressed the issue of overcoming the problems of creating a uniform discharge in a TE laser. For example, U.S. Pat. No. 3,986,139 discloses a TEA laser that incorporates a radioactive source to provide a partial ionization of the gas medium in the electrode area to provide a uniform pre-ionization.

U.S. Pat. No. 4,905,251 discloses a TE laser utilizing a resistive electrode assembly with pre-ionization; however, the patent does not adequately disclose how the resistive electrode is made. The suggested chemically inert semiconductor material suitable for a sealed laser is not commercially available and generally does not exist.

Barium titanite, uniformly doped, and formed in large sheets, is not commercially available and, assuming it is possible to fabricate, would be a very expensive electrode material and therefore cost prohibitive.

U.S. Pat. No. 3,743,881 discloses a laser utilizing a bulk material with a resistivity to compensate for changes in electrical potential in response to a change in current density; however, the patent does not address other factors that initiate the glow-to-arc transition, such as maintaining uniformity of the applied electric field.

U.S. Pat. No. 4,166,986 discloses a laser utilizing a plurality of individual ballast resistors; however, the array of pins creates local distortions of the electric field, which is followed by a glow-to-arc transition.

One of the primary concerns in fabricating a resistive electrode in a sealed TE laser is the choice of material for the resistive electrode, which most often chemically reacts with the laser gas. The chemical reaction between the resistive electrode and the laser gas changes the laser gas composition, and as a result, the laser gas becomes ineffective as a laser gain medium.

The selection of resistive electrode material for profiled metal electrode TE lasers is limited by surface properties of the electrode material. The resistive electrode material should have uniform secondary emission properties to avoid hot spots on the cathode, such as the hot spots that are clearly visible in the discharge photographs shown in T. A. Johns and J. A. Nation, *A Resistive Electrode, High Energy, Transverse Laser Discharge*, Rev. Sci. Instrum., Vol. 44, No. 2, Pg. 169.

What is needed is a TE/TEA laser that has a higher pressure, a higher volume, a longer pulse duration, and a higher repetition rate versus the prior art TE/TEA lasers and a TE/TEA laser that has a uniform discharge without developing arcs between the electrodes.

DISCLOSURE OF THE INVENTION

It is, therefore, an object of the present invention to provide a TE or TEA laser that has a longer pulse duration and a higher repetition rate when compared to the prior art TE/TEA lasers.

It is also an object of the present invention to provide a TE or TEA laser that has a uniform laser discharge without a glow-to-arc transition between the electrodes.

It is also an object of the present invention to provide a TE or TEA laser that utilizes a layered resistive electrode assembly that distributes discharge current uniformly over a large area.

It is also an object of the present invention to utilize a positive temperature coefficient of resistivity material in a distributed geometry.

It is also an object of the present invention to provide a TE or TEA laser that utilizes a resistive electrode assembly that compensates for temperature induced resistivity variations of the electrode assembly.

It is also an object of the present invention to provide a TE or TEA laser wherein the resistivity and the thermal coefficient of resistivity of a layered electrode assembly may be adjusted and controlled by the geometry of the layered components.

It is also an object of the present invention to utilize a pre-ionization corona discharge to promote development of a uniform discharge.

It is also an object of the present invention to disclose a resistive electrode assembly that produces a gas discharge only along a folded optical path in a laser with a folded configuration.

It is also an object of the present invention to provide a TE or TEA laser that has a uniform discharge without a glow-to-arc transition between the electrodes, and wherein the laser is manufactured and maintained at a relatively low cost when compared to the prior art.

According to the present invention, a transverse excitation (TE) or a transverse excitation atmospheric (TEA) laser has a resistive electrode assembly, which provides a resistive ballast in a distributed geometry for the laser gas discharge.

The resistive electrode assembly has a layer of positive temperature coefficient (PTC) of resistivity material and a layer of negative temperature coefficient (NTC) of resistivity material. The net effect of the PTC and NTC properties favors the PTC material so that the over all assembly is designed to behave as a single, PTC material; as the current flows through the resistive electrode assembly, the net resistivity of the assembly will increase as the assembly increases in temperature.

If the discharge current concentrates at a discrete location, as in a glow-to-arc transition, the localized heating caused by the current concentration will result in a reduction of the local current due to the increased local resistance of the PTC material.

The layered resistive electrode assembly of the present invention may be used in a pulsed or a continuous discharge TE/TEA laser configuration.

For the pulsed discharge TE/TEA laser, the NTC material is configured to extend beyond the main gas discharge region of the laser, the NTC material has sharp edges at the distal ends of the NTC material. Corona discharges develop around the sharp edges when a high voltage pulse is applied to the layered resistive electrode assembly. The corona discharges produce ultraviolet (UV) light, which pre-ionize the laser gas in the main discharge region.

The combination of the resistive slab and the PTC material eliminates arcs that are typical in TE/TEA lasers by limiting the current flow to localized concentrations of electrical current, or hot spots, which typically occur on the electrode surfaces. The resistive layered electrical assembly of the present invention utilizes the distributed geometry of the PTC/NTC materials, not the laser electrical circuit, to distribute the electrical current through the electrode assembly.

The layered resistive electrode assembly may be used for any combination of laser oscillators and laser amplifiers. The layered resistive electrode assembly may also be used in a folded configuration laser where the electrode assembly is used only along the optical paths, so as to electrically excite only the regions of the laser gas in the optical path, which results in a compact laser design.

The foregoing and other advantages of the present invention will become more apparent from the following description and accompanying drawings.

BEST MODE FOR CARRYING OUT THE INVENTION

Figure 1:
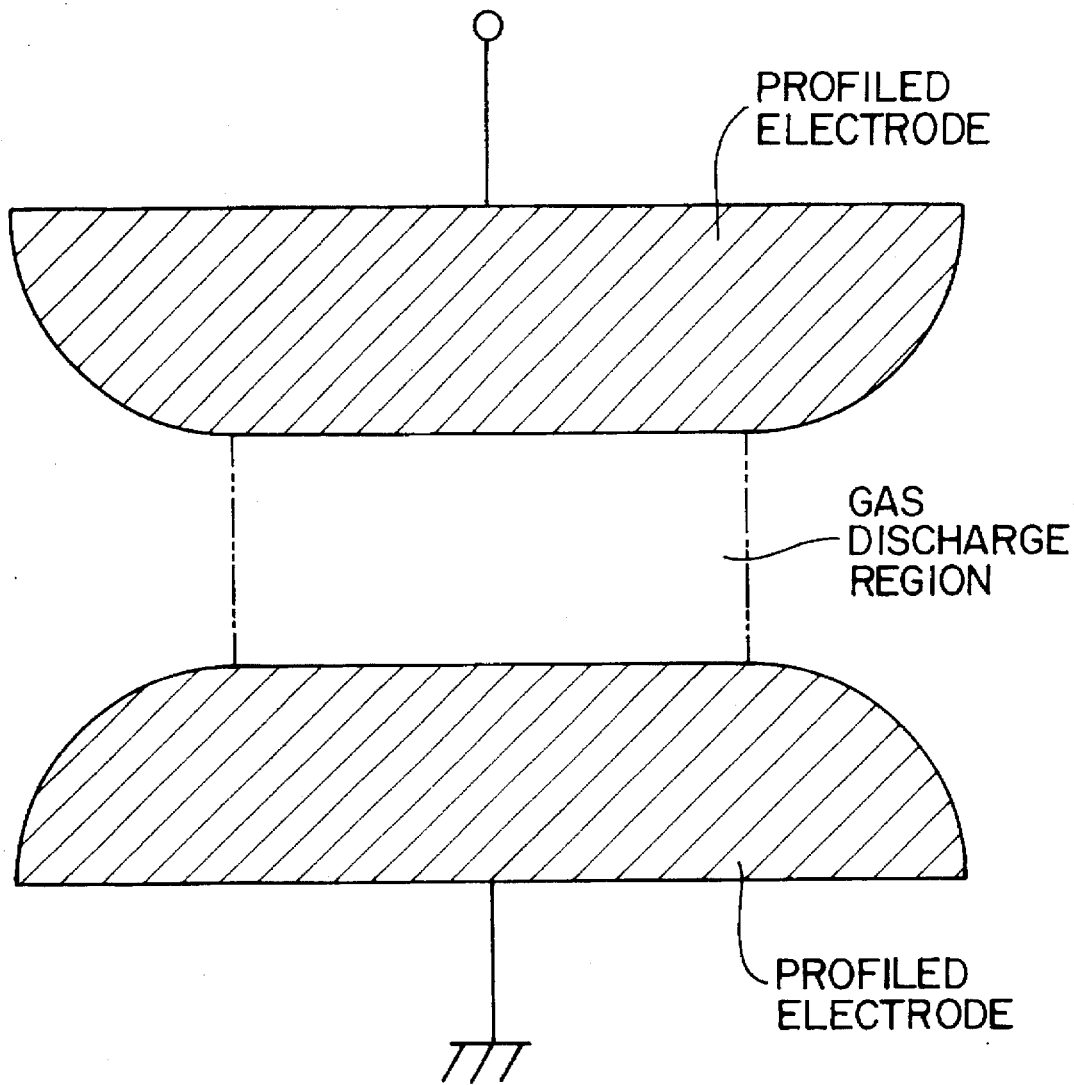
FIG. 1 is a cross sectional view looking down the optic axis of an electrode assembly of the prior art.

According to the present invention a TE or TEA (TE/ TEA) laser is disclosed that utilizes a layered resistive electrode assembly that has a higher pressure, a higher volume, a longer pulse, and a higher repetition rate versus the prior art TE/TEA lasers. The TE/TEA laser of the present invention also has a uniform discharge without the development of arcs between the electrodes.

It is a challenge in the design of a sealed resistive electrode TE/TEA laser to find a large area resistive electrode material that is chemically inert, that is economical, and that is high temperature resistant. Nevertheless, the resistive electrode material should also contain material that is not permeable to helium, which is one of the gases used in a typical carbon dioxide (CO2) laser gas mixture, and the sealed laser must be made from materials that do not leak helium.

Some of the most desirable resistive electrode materials have negative temperature coefficients (NTC) of resistivity. The NTC materials have less resistivity with increasing temperature. An NTC material is not desirable as an electrode material because as a localized electrode hot spot develops, a glow-to-arc transition develops in the laser gas at a discrete location, the local electrode resistivity decreases, and more current flows through the discharge at the electrode hot spot, leading to an arc discharge.

Unlike an NTC material that tends to promote the glow-to-arc transition process, a positive temperature coefficient (PTC) material will have the opposite affect on discharge uniformity. As a PTC resistive electrode increases in temperature at a localized, discrete, location, the resistivity will increase at the location and reduce the discharge current at that location. As a result of the PTC, the glow-to-arc transition process will be diminished or terminated. Thus, a PTC material is the best material to be used for a resistive electrode TE/TEA laser. However, the PTC materials that are available have additional properties, such as, gas permeability and limitations in size and availability, which do not allow PTC materials to be used in direct contact with the laser gas.

Therefore, the TE/TEA laser of the present invention combines an NTC resistive electrode material with a PTC resistive electrode material in a layered arrangement so that the PTC material is not in direct contact with the laser gas.

The NTC material is chosen to have high temperature properties, to be impermeable to helium, to be chemically inert, and to be economical to obtain in large, structurally strong, sheets able to withstand at least 14.7 pounds per square inch (psi). A wide variety of semiconductor materials may be used as the NTC material; for example, silicon carbide or doped silicon are just two semiconductor materials that may be utilized.

A variety of PTC materials may be used for the PTC layer, providing the PTC material is economical and has uniform electrical properties over the total area of the PTC material. One example of a PTC material that may be used in the resistive electrode assembly of the present invention is barium titanite doped with strontium, such as the material used for the production of thermistors.

The TE/TEA laser of the present invention also has a larger optical aperture width in relation to the size of the layered electrode assembly versus the prior art TE/TEA lasers. The optical aperture width of the TE/TEA laser is typically 1 centimeter or greater. The profiled electrodes of the prior art TE/TEA lasers use large radius of curvature edges around the main discharge area of the electrodes, see FIG. 1, so that the electrode assembly is relatively large. The electrode assembly of the present invention does not utilize the bulky curved edges around the main discharge area so the laser of the of the present invention has a compact laser design versus the prior art TE/TEA lasers.

Figure 2:
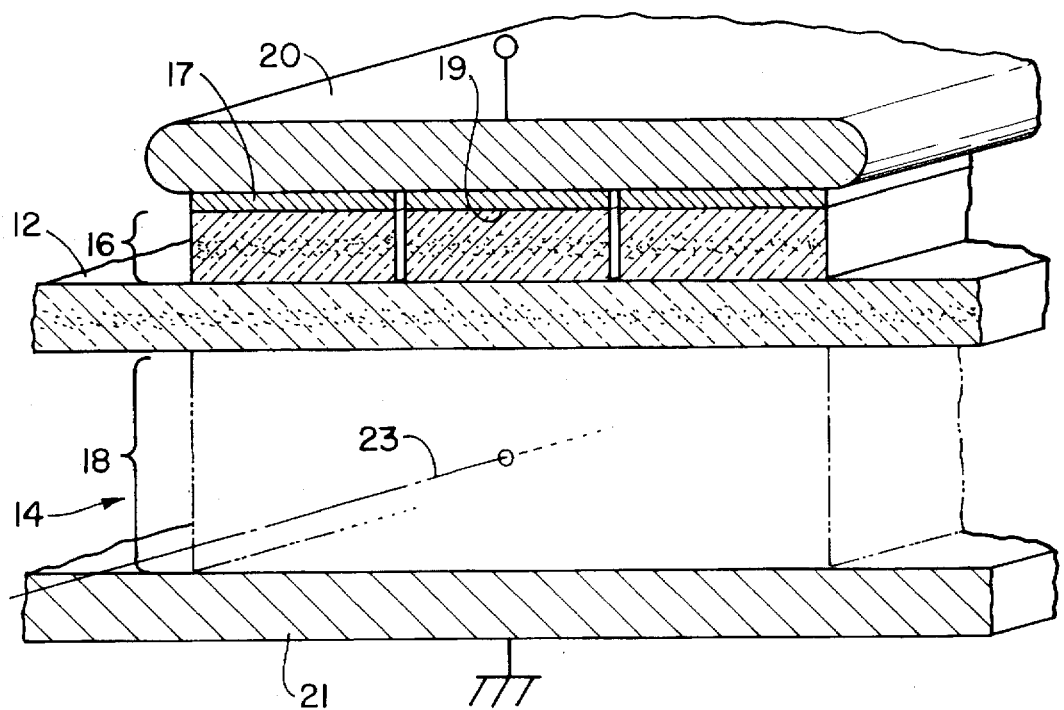
FIG. 2 is a perspective view of an electrode assembly of the present invention.

According to the present invention, a layered resistive electrode assembly 10 for a TE laser of the present invention is shown in FIG. 2. A layer of NTC material 12 is in direct contact with the laser gas 14 so that the NTC thermal, chemical, and mechanical properties may be utilized. The NTC layer is formed from a large area, continuous sheet of NTC material so that the NTC layer 12 functions as a gas tight wall of the laser gas envelope.

A layer of PTC material 16 is adjacent to and located external of the NTC layer 12 and the laser gas 14 so that the PTC material 16 is essentially sealed from the laser gas mixture 14. The PTC layer 16 is in contact with the NTC layer 12. The laser gas 14 is located in a main gas discharge region 18, which is internal of the NTC layer 12. The main gas discharge region 18 and the electrode assembly 10 are aligned with a longitudinal axis 23.

The PTC layer 16 does not need to be fabricated from a continuous sheet of PTC material. The PTC layer 16 may instead be fabricated from a plurality of PTC material tiles arranged in a matrix configuration with the tiles being in close proximity to each other. The PTC layer 16 has a conductive metalized coating 17 on an external surface 19.

A metal electrode 20 adjacent to and external of the PTC layer 16 forms the final external layer of the resistive electrode assembly 10. A ground electrode 21 is located at the opposite side of the discharge area 18 in relation to the NTC layer 12.

The metal electrode is in contact with the PTC layer metalized coating 17. The PTC metalized coating 17 allows for better electrical contact between the PTC layer 16 and the metal electrode 20 so that the current may be distributed uniformly through the PTC layer 16.

The function of the resistive electrode assembly 10 is to provide a resistive ballast for the gas discharge region 18 of the laser. The assembly is designed so that the net affect of the NTC layer 12 and the PTC layer 16 properties of the two resistive materials slightly favors the PTC layer 16. The assembly 10 is designed to behave as if it were equivalent to a single layer of PTC material. Thus, as the current flows through the PTC layer 16 and then through the NTC material, the net resistivity of the assembly will rise slightly as the assembly increases in temperature.

If the current starts to concentrate at one discrete location, such as in a glow-to-arc transition, the local heating caused by the current concentration will result in a reduction of the local current due to the increased local resistance of the PTC layer 16.

The thickness of the NTC and the PTC layers will be determined by the bulk resistivity of each particular material. The bulk resistivity of the NTC material and the PTC material will generally each be in the range of 20 to 200 ohm-centimeters. The NTC and the PTC layers each have a thickness ranging from 0.050 to 0.150 inches. The thicknesses of the layers are determined by the particular TE laser design parameters, such as gas pressure, gas mixture, and main gas discharge region dimensions.

The overall resistance of the layered resistive electrode assembly is designed to result in a voltage drop of approximately 10% of the voltage drop across the main discharge region during operation.

The relative thicknesses of the NTC and the PTC layers are designed to result in an overall layered resistive electrode assembly with a desired, effective resistivity and thermal coefficient of resistivity, at a certain temperature T. Over a small temperature range around T, the temperature dependance of the resistance of the NTC and the PTC layers (R2 and R1 respectively) can be modeled as having a linear variation with T given by:

$$R1 = \frac{(M1*T + b1)*t1}{A}$$

and;

$$R2 = \frac{(-M2*T + b2)*t2}{A}$$

where t1 and t2 are the thicknesses of the PTC and the NTC layers respectively. M1 and M2 are the thermal coefficients of resistivity of the PTC and the NTC layers respectively. b1 and b2 are constants that are determined by the bulk resistivity of the PTC and the NTC materials at temperature T. The area of the electrode assembly is A.

The overall thickness of the electrode assembly is defined as:

$$t0 = t1 + t2$$

and the ratio of the thicknesses of the NTC and the PTC layers is defined as:

$$K = \frac{t2}{t1}$$

The effective resistance (Reff) of the layered resistive electrode assembly is the sum of R1 and R2;

$$Reff = \frac{[(M1 - M2*K)*T + b1 + b2*K]*t0}{(1+K)*A}$$

Note that by adjusting the thickness ratio K of the NTC and the PTC layers, the temperature dependance of Reff can be made to have a positive or negative slope.

In regards to the present invention, the slope is adjusted by design to be slightly positive. In addition, note that by adjusting the overall thickness t0 of the PTC and the NTC layers, the desired value of Reff at temperature T may be obtained.

The layered resistive electrode assembly may be used in pulsed or continuous discharge TE/TEA laser configurations. The pulsed discharge configuration benefits from the addition of an ultraviolet (UV) pre-ionization structure to the layered resistive electrode assembly.

Figure 3:
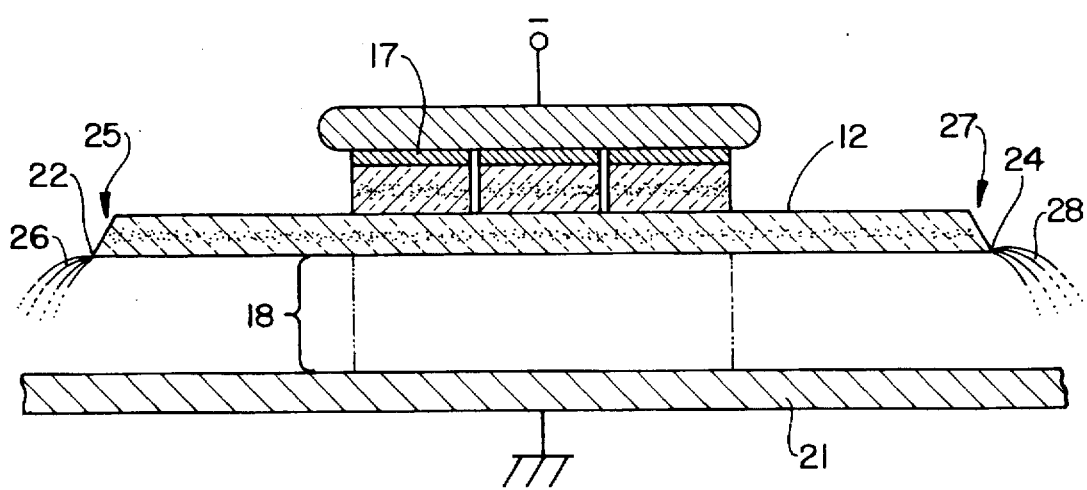
FIG. 3 is a cross sectional view looking down the optic axis showing the electrode assembly of the present invention with a UV pre-ionization structure.

As shown in FIG. 3, a UV pre-ionization structure is added to the NTC layer 12. The UV pre-ionization structure is the extended NTC layer 12 on both sides of the main gas discharge region 18 of the laser. The NTC layer 12 has a first lateral side 25 and a second lateral side 27. The lateral sides are parallel to the longitudinal axis 23. The lateral sides 25 and 27 have sharp, acute angled edges 22 and 24, which are closest to the gas discharge region 18 of the laser.

Corona discharges 26 and 28 will form around the sharp edges 22 and 24 of the NTC layer 12 when a high voltage pulse is applied to the metal electrode of the layered resistive electrode assembly. The corona discharges will produce UV light, which will pre-ionize the laser gas in the main discharge region 18.

The NTC layer 12 is made to extend beyond the main discharge region 18 of the laser to prevent the distortion of the electric field in the main discharge region 18 and to provide additional resistance to limit the amount of energy going into the corona discharges.

Other well known types of pre-ionization structures may be used in conjunction with the layered resistive electrode assembly, such as arc arrays or trigger wires, but the extended NTC layer pre-ionization structure of the present invention is most advantageous due to the compactness and simplicity of the extended NTC layer design.

The layered resistive electrode structure may be used with great advantage in TE/TEA lasers with a means for producing a rapid transverse flow of the laser gas through the main discharge region of the laser. Such rapid transverse flow of the laser gas is known to allow high pulse repetition rates to be achieved.

Under high pulse repetition rate conditions, the thermal compensation properties of the layered resistive electrode assembly become more important since the heating of the NTC layer is more severe. The transverse flowing gas may be part of a closed cycle, recirculating gas system, which is sealed from the atmosphere. The closed cycle gas system may contain a solid catalyst to recombine the laser gas and/or a heat exchanger to cool the laser gas.

The layered resistive electrode assembly may also be used in a TE/TEA laser operating in the continuous discharge mode. In the case of continuous discharge operation, no pre-ionization is needed and the NTC layer 12 is sealed to the electrically insulating housing of the laser.

For the case of the continuous discharge TE/TEA laser, one or both of the electrodes may be layered resistive electrode assemblies. For the case where only one layered resistive electrode assembly is used, the other electrode may be made of a metal with properties suitable for use as a Direct Current (DC) laser electrode.

For the continuous discharge TE/TEA laser, the NTC layer only extends beyond the width of. the PTC layer to allow for an O-ring seal. The NTC seal material does not have a sharp edge since pre-ionization is not required.

Pre-ionization is only needed for pulsed discharge TE lasers to bias the initial conditions in the main discharge region to produce a glow discharge throughout the region when a high voltage pulse is applied. The pre-ionization discharge has no influence on the discharge in the main discharge region after the main discharge has been established.

For the case of a continuous discharge TE laser, a pre-ionization discharge would be of no use, except when the laser is first turned on. Nevertheless, the need for a uniform discharge is typically not important during the brief initial start-up of a continuous discharge TE laser, therefore, no pre-ionization is required for the continuous discharge TE laser. After start-up, the discharge will transition to a uniform discharge as a result of the distributed ballast effect of the layered resistive electrode assembly of the present invention.

Figure 4:
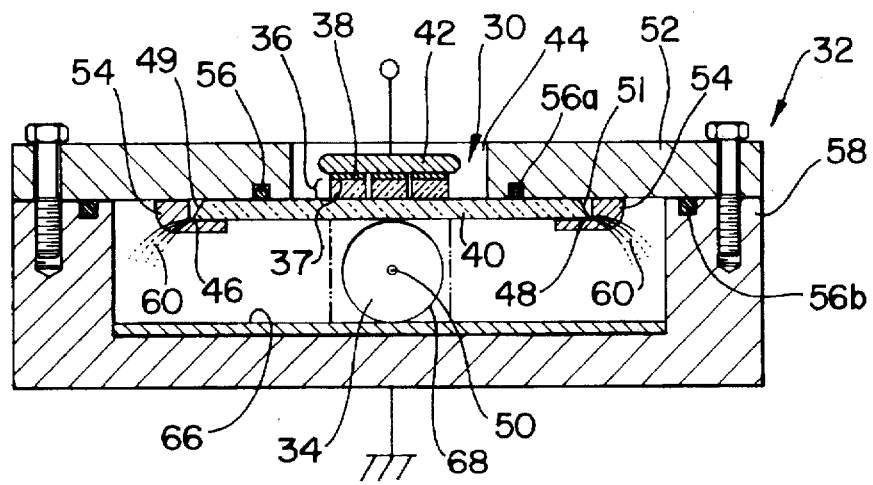
FIG. 4 is a cross sectional view looking down the optic axis of the electrode assembly of the present invention incorporated into a TE/TEA laser.

As shown in FIG. 4, a layered resistive electrode assembly 30 of the present invention is shown incorporated into a TEA laser 32. The laser 32 is a CO2 TEA laser and uses energy from a pulsed high voltage energy storage capacitor. The current pulse through the laser discharge area 34 typically will last for several hundred nanoseconds.

The CO2 TEA laser 32 utilizes a layered resistive electrode assembly 30 and consists of a PTC layer 36 made from a plurality of PTC tiles 38 adjacent to a layer of uninterrupted NTC material 40. The NTC layer 40 is internal of the PTC layer 36, and a metal electrode 42 made from copper is external of and adjacent to the PTC layer 36. The metal electrode 42, the cathode of the laser, is in contact with a metalized coating 37 on the external surface of the PTC layer 36.

The layered resistive electrode assembly is encompassed in an insulating potting material 44 to prevent arcs between the metal electrode 42 and the NTC layer 40. The potting material 44 also securely attaches the plurality of PTC tiles 38 in position, preventing lateral movement of the tiles.

The metal electrode 42 is smooth and round along its peripheral edges to keep the electric field relatively low in the potting compound 44, essentially preventing arcs between the metal electrode 42 and the NTC layer 40.

The NTC layer 40 is wider than the PTC layer 36. The NTC layer 40 has a first lateral side 49 and a second lateral side 51, the lateral sides 49 and 51 are parallel with a longitudinal axis 50. The lateral sides 49 and 51 have sharp edges 46 and 48 respectively.

The NTC layer 40 is clamped to an insulating plastic or ceramic cover plate 52 by a plurality of metallic clamps 54.

The metallic clamps 54 are smooth and round to prevent arcing within the laser gas. The clamps 54 are relatively small so as not to interfere with the pre-ionization discharges.

A Viton O-ring seal 56 is located between the cover plate 52 and the NTC layer 40 to prevent the gas mixture from escaping from the gas discharge region 34. The cover plate 52 is mounted on the optical frame 58 and sealed by the O-ring 56.

The optical frame 58 is made from an aluminum alloy and is made with adequate width so that the pre-ionization corona discharges 60 will extend from the NTC layer sharp edges 46 and 48 down to the bottom surface 66 of the optical frame 58.

The optical frame 58 is also made with adequate width so that the main gas discharge region 34 has a uniform electric field, undistorted by the side walls of the optical frame 58.

The main gas discharge region 34 of the laser is directly under the PTC layer 36 and is aligned with the optical apertures 68 of the optical frame 58.

Figure 5:
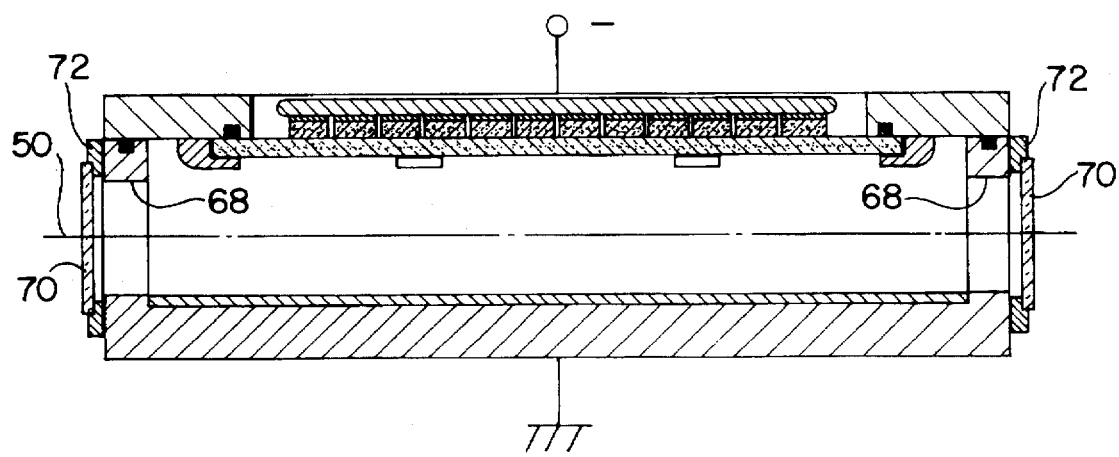
FIG. 5 is a cross sectional longitudinal view of the electrode assembly of the present invention incorporated into a TE/TEA laser.

Referring to FIG. 5, mirrors 70 are located at each end of the optical frame 58 and are either glued or hard sealed to sealed aperture rings 72. The sealed aperture rings are glued or fastened to the optical frame 58.

Figure 6:
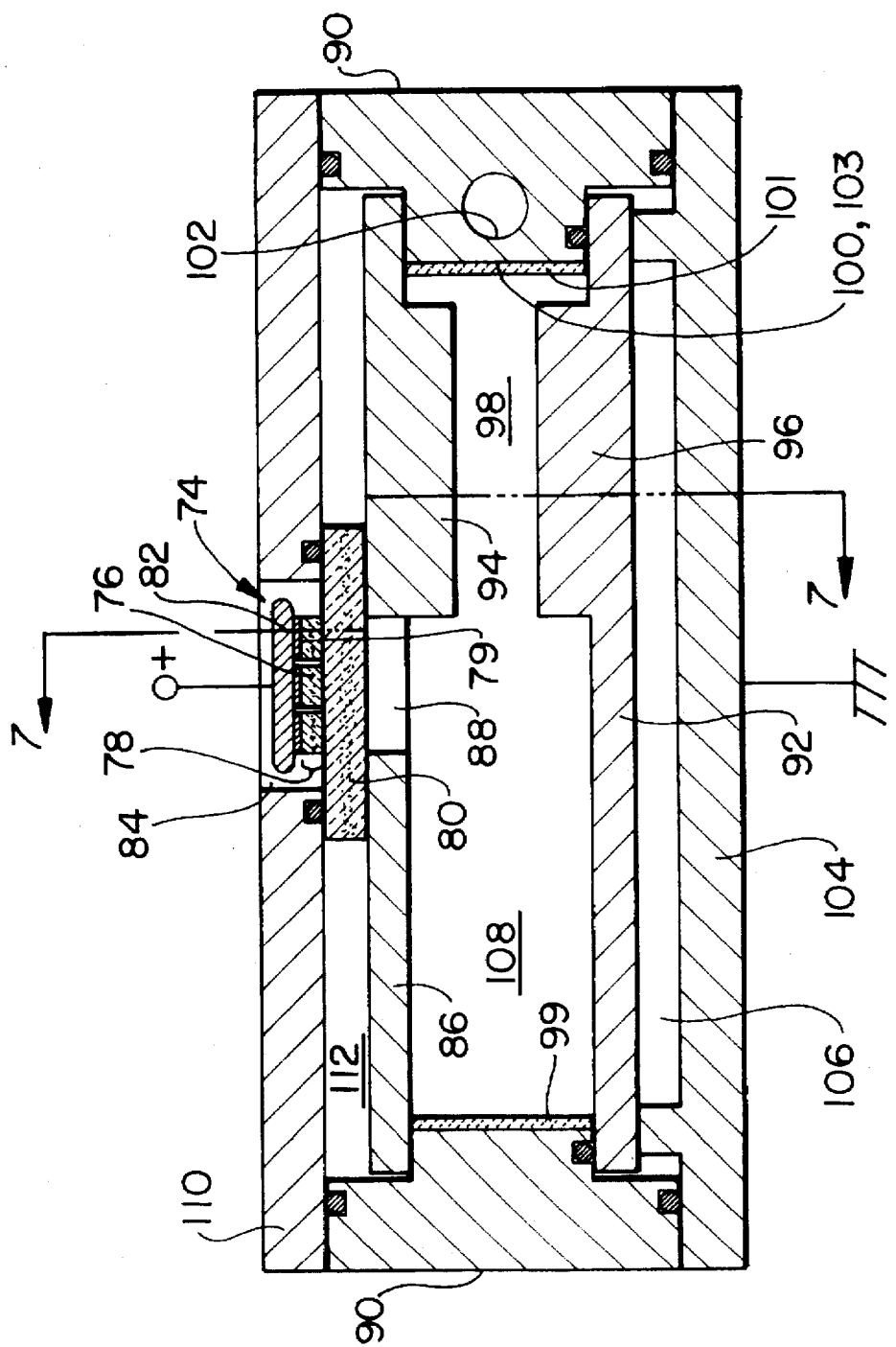
FIG. 6 is a cross sectional view looking down the optic axis of an electrode assembly of a second embodiment of the present invention.

In a second embodiment of the present invention and as shown in FIG. 6, a CO2 TE laser operates generally below atmospheric pressure at approximately 100 Torr. A layered resistive electrode assembly 74 is utilized that is similar to the above described electrode assembly, except that no pre-ionization is required. The discharge for the laser of the second embodiment may utilize either a very long current pulse (100's of microseconds) or continuous current.

The layered resistive electrode assembly 74 consists of a plurality of PTC tiles 76 comprising a PTC layer 78 between a continuous, non-interrupted, layer of NTC material 80 and a metal electrode 82 preferably made from copper. The metal electrode 82 is external of the PTC layer 78 and the NTC layer 80 is internal of the PTC layer 78. The metal electrode 82 is in contact with a metalized coating 79 on the external surface of the PTC layer 78.

The layered resistive electrode assembly 74 is encompassed in potting material 84 to prevent arcing between the copper electrode and the NTC layer 80 and to securely attach the tiles to the electrode assembly. The resistive electrode assembly 74 is mounted on top of a ceramic plate 86, which has a plurality of apertures 88 located directly internal of the resistive electrode assembly 74.

The plurality of apertures 88 are drilled relatively close together and are aligned along the longitudinal length of the resistive electrode assembly 74 adjacent to the ceramic plate 86. The plurality of apertures 88 are used instead of a long slot in the ceramic plate 86 to maintain the structural integrity of the ceramic plate 86. The ceramic plate 86 is internal of the aluminum optical frame 90 of the laser.

A second ceramic plate 92 similar to and parallel with the ceramic plate 86 is mounted in the optical frame 90. The two ceramic plates 86 and 92 each have a raised ridge area 94 and 96 opposing each other. The raised ridges 94 and 96 extend internally to form a slab discharge, or a discharge channel 98.

The discharge channel 98 is readily cooled by the close proximity of the raised ridges 94 and 96. A first side 103 of the wall 101 of the optical frame 90 serves as a cathode 100 of the laser. The cathode surface is plated with a platinum catalyst coating to aid in the recombination of the CO2 laser gas.

A cooling water passageway 102 is located in close proximity to the cathode 100 to prevent warping of the optical frame 90 due to heat from the gas discharge. The passageway 102 is located in the optical frame 90.

An aluminum bottom plate 104 is mounted on the optical frame 90 of the laser. The bottom plate 104 is parallel with the second ceramic plate 92. A second cooling water passageway 106 is located between the second ceramic plate 92 and the bottom plate 104.

A gas ballast volume space 108 is located between the discharge channel 98 and the optical frame wall 99. The width of the space 108 is greater than the discharge path from the layered resistive electrode assembly 74 to the cathode 100 to essentially prevent a discharge from occurring in the space 108. The space 108 also serves as a gas ballast volume for the laser and it is advantageous to make the volume large to enhance the sealed lifetime of the laser.

A third ceramic plate 110 is mounted adjacent to the electrode assembly 74 to seal the gas around the NTC layer 80. The third ceramic plate is parallel to the first ceramic plate 86. A second gas ballast volume space 112 is located between the third ceramic plate 110 and the first ceramic plate 86. The second gas ballast volume space 112 serves to add additional gas ballast volume. The second gas ballast volume space 112 communicates with the main gas volume by a plurality of holes 113 drilled in the optical frame 90.

Figure 7:
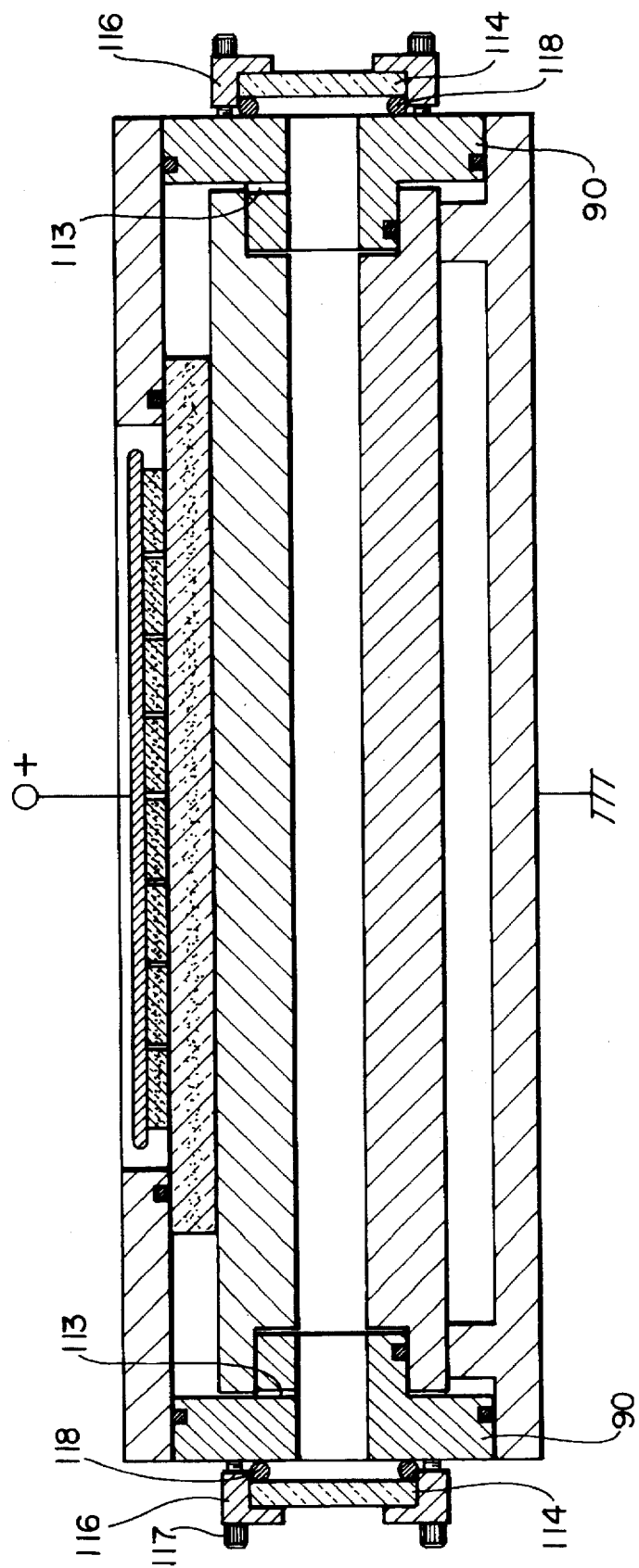
FIG. 7 is a cross sectional longitudinal view of the electrode assembly of the second embodiment of the present invention.

Referring to FIG. 7, the optical cavity of the laser is formed by mirrors 114 that are clamped to the optical frame 90 by rings 116 and fasteners 117. There are three (3) screws for each ring 116. The mirrors 114 are mounted and sealed against the optical frame 90 by Viton O-rings 118.

The discharge path for the laser of the second embodiment does not follow a straight line, but contains a right angle. This is largely due to the mechanical assembly and gas sealing requirements of the design for the laser of the second embodiment.

The optical frame 90 is most economical to manufacture when it is constructed from a metal alloy and machined to the final configuration. The ceramic plates 86 and 92 are of a planar geometry so that the plates are easily manufactured on a grinding machine.

The optical frame 90 is of an annular geometry so that the O-ring grooves may be machined into the optical frame 90 and so that the O-rings seal the laser gas medium in the optical frame 90.

An advantage of the laser configuration of the second embodiment is that the ceramic plate 92 may be cooled by water flowing through passageway 106. The layered resistive electrode assembly is mounted on the electrically insulating ceramic plate 86 and the resulting geometry has a right angle bend in the discharge path.

The optical frame 90 of the second embodiment must be made from a strong and inexpensive material, such as aluminum, which also happens to be an electrical conductor. Nevertheless, the first and second ceramic plates 86 and 92, which confines the discharge in the optical discharge channel 98, must be made from an insulating material, such as alumina ceramic. The ceramic plates 86 and 92 are economically fabricated and assembled if they are of a planar geometry.

The design of the second embodiment allows one of the inside walls of the optical frame to be the cathode of the laser, which benefits from the cooling water flowing through the cooling passageway 102. Therefore, the gas discharge is introduced through the array of holes in the ceramic plate 86, the geometry of which requires a right angle bend in the discharge path.

Another distinction between the first and the second embodiments is the discharge channel 98 of the second embodiment. The laser of the first embodiment did not have walls on each side of the main discharge region because the walls would block the UV light required for pre-ionization.

In addition, if the first embodiment had side walls, the side walls would block the transverse gas flow for a high repetition rate, transverse flowing gas TEA laser.

The laser of the second embodiment does not have a flowing gas requirement or the need for pre-ionization; however, the laser of the second embodiment does benefit from the gas cooling provided by the close proximity of the side walls. If a waveguide laser is utilized, the side walls may also serve as an optical waveguide to reduce diffraction loss in the optical cavity of the laser.

In the case of the first embodiment shown in FIG. 4, the metal electrode 42 may be operated with a negative voltage. It has been found that the performance of the pre-ionization corona discharges is best when the voltage of electrode 42 is negative when utilized in a pulsed discharge TEA laser. Nevertheless, for the continuous discharge mode of operation, as in the case of the second embodiment of the present invention, there is not a pre-ionization requirement, and therefore, it is advantageous to make the metal electrode 82 in FIG. 6 positive so that the cathode 100 may be water cooled and coated with catalyst materials, such as platinum or gold, to help with recombination of CO and O2 to reform CO2.

Figure 8:
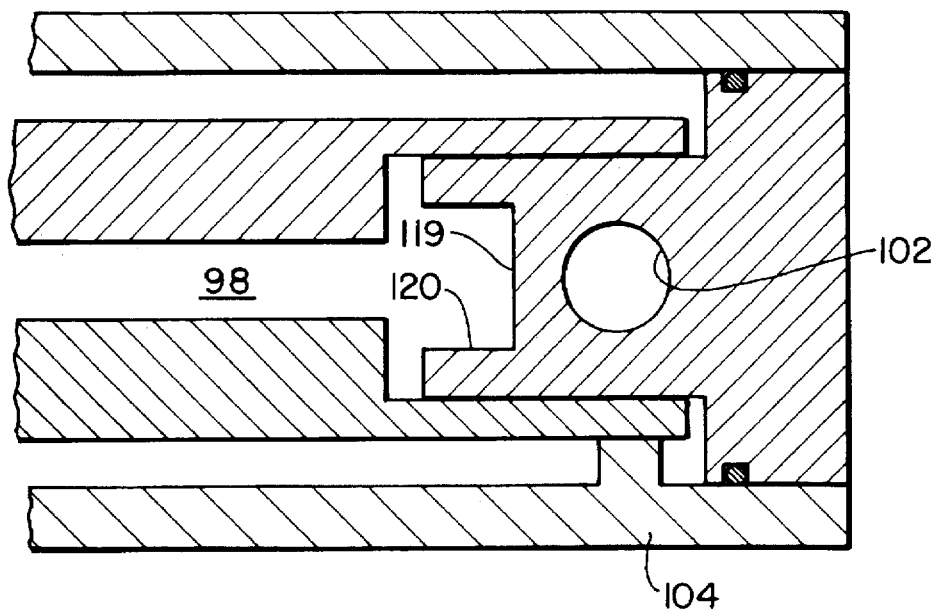
FIG. 8 is a cross sectional view looking down the optic axis of an electrode assembly of a third embodiment of the present invention.

A third embodiment is shown in FIG. 8, which is similar to the above described second embodiment, except that the cathode is constructed as a hollow cathode 119 formed by a metal "U" shaped channel 120 running along the length of the laser to adjust the surface area of the cathode for the best normal glow discharge operating conditions.

Figure 9:
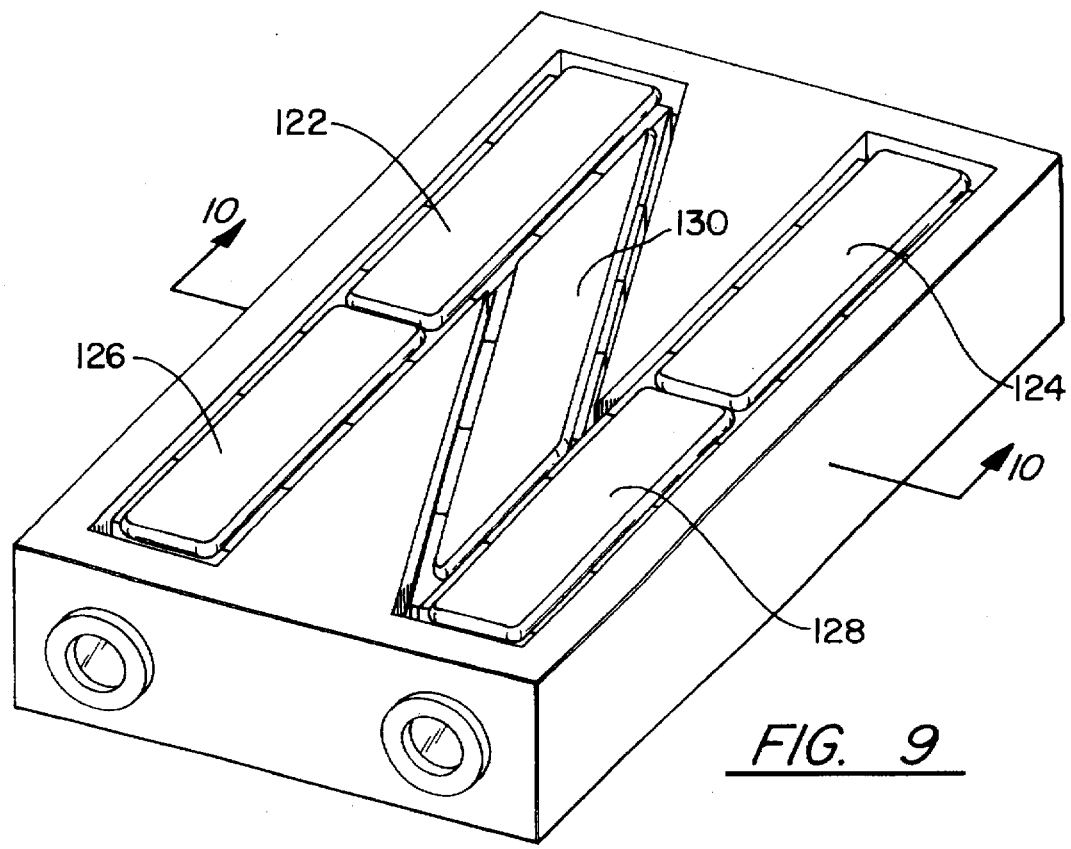
FIG. 9 is a perspective view of an electrode assembly of a fourth embodiment, wherein the electrode assembly has a folded optical path.

A fourth embodiment of the present invention is shown in FIG. 9, and is similar to the above described second embodiment, except that the optical path is folded. The layered resistive electrode assembly is configured to follow the folded pattern of the optical path. As with the above described embodiments, the embodiment shown in FIG. 9 may be a laser oscillator or an optical amplifier.

Figure 10:
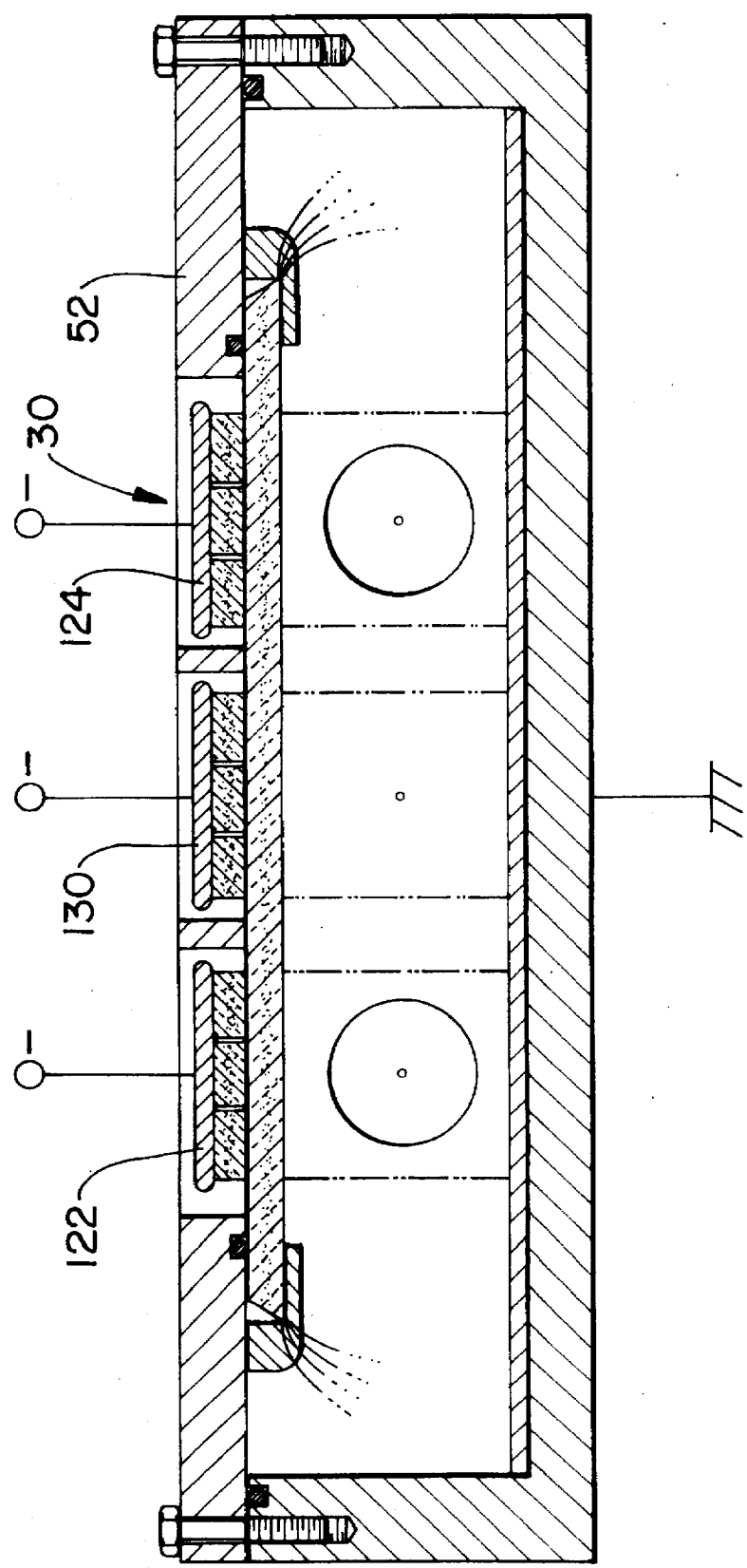
FIG. 10 is a cross sectional view looking down the optic axis of the electrode assembly of the fourth embodiment.

The embodiment shown in FIG. 9 has a "Z" fold optical path consisting of four optical elements and three segments of the optical path; however, other configurations with any number of arbitrary optical paths may be utilized. FIG. 10 shows only two optical apertures because of the "Z" fold configuration.

The use of the layered resistive electrode assembly for a folded TE or TEA laser is advantageous since the laser discharge will only occur in the regions where the optical path is located. The regions between the segments of the optical path are not pumped, and therefore, energy is not wasted. The prior art profiled electrode TE lasers do not have this advantage because the profiled electrodes are made wide enough to cover the entire area of the "Z" fold pattern, including the regions between the segments of the optical paths.

Segmentation of the layered resistive electrode assembly has the advantage that each electrode assembly can be connected to an independent energy storage capacitor, which limits the energy availability to each electrode assembly.

Segmentation of the electrode assemblies allows the assemblies to be energized independently and synchronized in relation to each other. Referring to FIG. 9, external electrodes 122, 124, 126, and 128 are pulsed first, allowing the pre-ionization discharges to occur. The UV light from the main discharges associated with external electrodes 122, 124, 126, and 128 pre-ionize the discharge region associated with internal electrode 130, which is pulsed with high voltage slightly later in time in relation to external electrodes 122, 124, 126, and 128.

Other folded configurations may be utilized that would have more than one central portion of the optical path. The corresponding electrodes would be synchronized so that the outer electrodes would be pulsed first and then the remaining folded portion electrodes would be pulsed in sequence, with the central electrodes being pulsed last.

The layered resistive electrode assembly of the present invention is discussed in reference to pulsed and continuous DC discharge lasers; however, the layered resistive electrode assembly of the present invention may also be used to achieve a uniform current distribution and discharge uniformity in a TE laser for the case where the discharge current has a component that is periodically alternating in direction. The frequency of the alternating current may exist in the range from DC to microwave frequency, (0–10 GHz).

The layered resistive electrode assembly of the present invention provides a laser that has a higher pressure, a higher volume, a longer pulse duration, and a higher repetition rate versus the prior art TE/TEA lasers. In addition, the laser has a uniform discharge without developing arcs between the electrodes.

The PTC and NTC layers combine to have a slight bias towards the PTC layer. As the current flows through the resistive electrode assembly, the net resistivity of the assembly will increase slightly as the assembly increases in temperature. If the discharge current concentrates at a discrete location, as in a glow-to-arc transition, the localized heating caused by the current concentration will result in a reduction of the local current due to the increased local resistance of the PTC material. The reduction in the local current will essentially terminate glow-to-arc transition at that location.

Corona discharges develop around the NTC sharp edges when a high voltage pulse is applied to a metal electrode of the layered resistive electrode assembly. The corona discharges produce ultraviolet (UV) light, which pre-ionize the laser gas in the main discharge region.

The combination of the resistive slab and the PTC eliminates arcs that are typical in TE/TEA lasers by limiting the current flow to localized concentrations of electrical current, or hot spots, which typically occur on the electrode surfaces.

Although this invention has been shown and described with respect to a detailed embodiment, those skilled in the art will understand that various changes in form and detail may be made without departing from the spirit and scope of the claimed invention. For example, the embodiments described above are for a TE laser; however, the present invention may also be utilized in axial discharge geometry lasers.

We claim:

1. A layered resistive electrode assembly for a TE/TEA laser, comprising:

means for increasing the resistivity of the electrode assembly at a discrete location as the electrode assembly increases in temperature at said discrete location; and a conductive layer, wherein said conductive layer is adjacent to said means for increasing the resistivitiy of the electrode assembly.

2. The layered resistive electrode assembly of claim 1, further comprising:

a first layer of metal electrode;

a second layer of positive temperature coefficient material, the second layer being adjacent to and internal of the metal electrode layer;

a third layer of negative temperature coefficient material, the third layer being adjacent to and internal of the second layer of positive temperature coefficient material.

3. The layered resistive electrode assembly of claim 2, the layer of positive coefficient material further comprising:

a plurality of tiles, the tiles being configured so as to comprise a matrix configuration.

4. The layered resistive electrode assembly of claim 3, the layer of positive coefficient material further comprising:

a layer of potting compound encompassing the positive coefficient material tiles so that the plurality of tiles is securely attached to the electrode assembly.

5. The layered resistive electrode assembly of claim 2, the layered resistive electrode having a longitudinal axis, said layer of negative temperature coefficient material further comprising:

a first lateral edge and a second lateral edge, both lateral edges being parallel with the longitudinal axis, the first and second lateral edges each having a beveled edge.

6. The layered resistive electrode assembly of claim 5, the first and second lateral edges each having an acute angled beveled edge.

7. The layered resistive electrode assembly of claim 5, wherein the metal electrode is operated with a negative voltage.

8. The layered resistive electrode assembly of claim 2, the layered resistive electrode having a longitudinal axis, the metal electrode further comprising:

a first lateral edge and a second lateral edge, both lateral edges being parallel with the longitudinal axis, the first and second metal electrode lateral edges being rounded so that arcs are essentially prevented from developing between the metal electrode and the negative temperature coefficient material.

9. The layered resistive electrode assembly of claim 2, wherein said layer of positive temperature coefficient material is made of barium titanite or barium titanite doped with strontium.

10. The layered resistive electrode assembly of claim 2, wherein said layer of negative temperature coefficient material is made of silicon carbide or doped silicon.

11. The layered resistive electrode assembly of claim 2, wherein said layer of positive temperature coefficient material has an external surface, said surface having a metalized coating.

12. The layered resistive electrode assembly of claim 2, wherein the layer of negative temperature coefficient material seals against a laser oscillator or laser amplifier frame so that the layer of positive coefficient material is essentially sealed from the laser gas mixture.

13. The layered resistive electrode assembly of claim 2, wherein the layer of negative temperature coefficient material is impermeable to helium and is chemically inert.

14. The layered resistive electrode assembly of claim 13, wherein the layer of negative temperature coefficient material being a structurally strong material able to withstand at least 14.7 psi.

15. The layered resistive electrode assembly of claim 2, wherein the electrode assembly is designed to behave as if it were equivalent to a single layer of positive temperature coefficient material.

16. The layered resistive electrode assembly of claim 2, wherein the bulk resistivity of the positive temperature coefficient material and the negative temperature coefficient material are each approximately 20 to 200 ohm-centimeters.

17. The layered resistive electrode assembly of claim 2, wherein the thicknesses of the positive temperature coefficient material and the negative temperature coefficient material are each approximately 0.050 to 0.150 inches.

18. The layered resistive electrode assembly of claim 2, wherein the overall resistance of the electrode assembly is designed to result in a voltage drop of approximately 10% of the voltage drop across the laser main discharge region during laser operation.

19. The layered resistive electrode assembly of claim 2, wherein the relative thickness of the negative temperature coefficient material layer and the positive temperature coefficient material layer are designed to result in an overall layered resistive electrode assembly with a desired, effective resistivity and thermal coefficient of resistivity, at a certain temperature T; the temperature dependance of the resistance of the positive coefficient material layer, R1, and the negative temperature coefficient material layer, R2, being modeled over a small temperature range T, as having a linear variation with T given by:

$$R1 = \frac{(M1*T+b1)*t1}{A}$$

and;

$$R2 = \frac{(-M2*T+b2)*t2}{A}$$

where t1 and t2 are the thicknesses of the positive temperature coefficient material layer and the negative temperature coefficient material layer respectively; M1 and M2 being the thermal coefficients of resistivity of the positive temperature coefficient material layer and the negative temperature coefficient material layer respectively; b1 and b2 being constants that are determined by the bulk resistivity of the positive temperature coefficient material layer and the negative temperature coefficient material layer respectively at temperature T; the area of the electrode assembly being A.

20. The layered resistive electrode assembly of claim 19, wherein the overall thickness of the electrode assembly is defined as:

$$t0 = t1 + t2$$

and the ratio of the thicknesses of the positive temperature coefficient material layer and the negative temperature coefficient material layer being defined as:

$$K = \frac{t2}{t1} ;$$

the effective resistance (Reff) of the layered resistive electrode assembly being the sum of R1 and R2;

$$Reff = \frac{[(M1 - M2*K)*T + b1 + b2*K]*t0}{(1+K)*A}$$

wherein the adjustment of the overall thickness t0 of the positive temperature coefficient material layer and the negative temperature coefficient material layer results in the desired value of Reff at temperature T; and wherein the adjustment of the thickness ratio K of the negative temperature coefficient material layer and the positive temperature coefficient material layer results in the temperature dependance of Reff being made to have a slightly positive slope.

21. The layered resistive electrode assembly of claim 2, wherein the metal electrode is made from copper.

22. The layered resistive electrode assembly of claim 2, wherein the electrode assembly is connected to an independent energy storage capacitor.

23. The layered resistive electrode assembly of claim 2, wherein the electrode assembly is energized by an alternating current in the range of approximately DC to microwave frequency, (0–10 GHz).

24. The layered resistive electrode assembly of claim 2, wherein the electrode assembly is energized by direct current.

25. A layered resistive electrode assembly for a TE/TEA laser, the laser having an optical frame, the electrode assembly being mounted to the optical frame, comprising:
   a first layer of metal electrode;
   a second layer of positive temperature coefficient material, the second layer being adjacent to and internal of the metal electrode layer;
   a third layer of negative temperature coefficient material, the third layer being adjacent to and internal of the second layer of positive temperature coefficient material, so that the electrode assembly increases the resistivity of the electrode assembly at a discrete location as the electrode assembly increases in temperature at said discrete location.

26. The layered resistive electrode assembly of claim 25, the layer of positive coefficient material further comprising:
   a plurality of tiles, the tiles being configured so as to comprise a matrix configuration.

27. The layered resistive electrode assembly of claim 26, the layer of positive coefficient material further comprising:
   a layer of potting compound encompassing the positive coefficient material tiles so that the plurality of tiles is securely attached to the electrode assembly.

28. The layered resistive electrode assembly of claim 25, the layered resistive electrode having a longitudinal axis, said layer of negative temperature coefficient material further comprising:
   a first lateral edge and a second lateral edge, both lateral edges being parallel with the longitudinal axis, the first and second lateral edges each having a beveled edge.

29. The layered resistive electrode assembly of claim 28, the first and second lateral edges each having an acute angled beveled edge.

30. The layered resistive electrode assembly of claim 25, the layered resistive electrode having a longitudinal axis, the metal electrode further comprising:
   a first lateral edge and a second lateral edge, both lateral edges being parallel with the longitudinal axis, the first and second metal electrode lateral edges being rounded so that arcs are essentially prevented from developing between the metal electrode and the negative temperature coefficient material.

31. The layered resistive electrode assembly of claim 25, wherein said layer of positive temperature coefficient material is made of barium titanite or barium titanite doped with strontium.

32. The layered resistive electrode assembly of claim 25, wherein said layer of negative temperature coefficient material is made of silicon carbide or doped silicon.

33. The layered resistive electrode assembly of claim 25, wherein said layer of positive temperature coefficient material has an external surface, said surface having a metalized coating.

34. The layered resistive electrode assembly of claim 25, wherein the layer of negative temperature coefficient material seals against a laser oscillator or laser amplifier optical frame so that the layer of positive coefficient material is essentially sealed from the laser gas mixture.

35. The layered resistive electrode assembly of claim 25, wherein the layer of negative temperature coefficient material is impermeable to helium and is chemically inert.

36. The layered resistive electrode assembly of claim 25, wherein the electrode assembly is designed to behave as if it were equivalent to a single layer of positive temperature coefficient material.

37. The layered resistive electrode assembly of claim 25, wherein the laser is a continuous wave, transverse discharge laser.

38. The layered resistive electrode assembly of claim 37, wherein the laser is energized by direct current.

39. The layered resistive electrode assembly of claim 25, wherein the laser is a slab discharge laser.

40. The layered resistive electrode assembly of claim 39, wherein the slab discharge is confined by the optical frame and insulating walls.

41. The layered resistive electrode assembly of claim 25, wherein the laser has a folded optical path, the electrode assembly having segments following the folded optical path.

42. The layered resistive electrode assembly of claim 41, wherein the electrode assembly segments are energized independently and are synchronized in relation to each other so that the external electrode segments are energized first to pre-ionize the gas discharge regions associated with the internal electrode segments.

43. The layered resistive electrode assembly of claim 42, wherein the optical path and the electrode assembly have a "Z" fold configuration.

44. The layered resistive electrode assembly of claim 42, wherein each electrode assembly segment is connected to an independent energy storage capacitor.

45. The layered resistive electrode assembly of claim 25, wherein the laser optical frame further comprises a cathode and a cooling passageway adjacent to the cathode.

46. The layered resistive electrode assembly of claim 45, wherein the cathode surface is plated with a platinum or gold catalyst coating to aid in the recombination of the $CO_2$ laser gas.

47. The layered resistive electrode assembly of claim 45, wherein the cathode has a channel configuration so that the cathode has a hollow portion extending along the length of the laser.

48. The layered resistive electrode assembly of claim 47, wherein the cathode surface is plated with a platinum or gold catalyst coating to aid in the recombination of the $CO_2$ laser gas.

49. The layered resistive electrode assembly of claim 25, wherein the optical frame further comprises an insulating cover plate, a plurality of clamps attaching the electrode assembly to the cover plate, the plate being in sealing contact with the negative temperature coefficient material so that the layer of positive coefficient material is essentially sealed from the laser gas mixture.

* * * * *